United States Patent [19]

Nakano et al.

[11] 4,322,469
[45] Mar. 30, 1982

[54] ELECTROSTATIC RECORDING MEDIUM

[75] Inventors: Keita Nakano; Masanori Itoh, both of Tokyo, Japan

[73] Assignee: Xerox Corporation, Stamford, Conn.

[21] Appl. No.: 207,556

[22] Filed: Nov. 14, 1980

[30] Foreign Application Priority Data

Dec. 6, 1979 [JP] Japan .................. 54/167460

[51] Int. Cl.$^3$ .......... B32B 7/02; B32B 27/36
[52] U.S. Cl. ............... 428/212; 346/135.1; 346/153.1; 427/121; 427/122; 428/215; 428/216; 428/323; 428/334; 428/335; 428/336; 428/403; 428/407; 428/408; 428/423.1; 428/424.8; 428/424.4; 428/424.6; 428/480; 428/483; 428/913; 428/697; 428/699; 428/701; 428/702
[58] Field of Search ............ 430/48, 90; 427/121, 427/122; 346/135.1, 153.1; 428/697, 699, 701, 702, 212, 215, 216, 408, 403, 323, 407, 334, 335, 336, 480, 483, 423.1, 423.7, 424.4, 424.6, 424.8, 913

[56] References Cited

U.S. PATENT DOCUMENTS

| | | | |
|---|---|---|---|
| 2,664,044 | 12/1953 | Dalton | 346/135.1 |
| 3,263,604 | 8/1966 | Dalton | 346/135.1 |
| 3,759,744 | 9/1973 | Schliesman | 428/701 |
| 3,823,034 | 7/1974 | Higaki | 428/697 |
| 3,861,954 | 1/1975 | Funderburk | 346/135.1 |
| 3,998,987 | 12/1976 | Kirigaya | 427/121 |
| 4,081,584 | 3/1978 | Akiyama | 427/121 |
| 4,241,134 | 12/1980 | Burwasser | 346/153.1 |
| 4,250,228 | 2/1981 | Fujioka | 428/697 |

Primary Examiner—Ellis P. Robinson

[57] ABSTRACT

An electrostatic recording medium for use in an electrographic process for forming an electrostatic latent image, and method for making such a recording medium, which includes a base, a resistance layer on the base, an adhesive layer on the resistance layer and a recording layer laminated to the resistance layer through the adhesive layer, the adhesive layer being made of a mateial so that the volume resistivity of the resultant recording medium is relatively unaffected by changes in humidity conditions.

10 Claims, 4 Drawing Figures

ELECTROSTATIC RECORDING MEDIUM

This invention relates to an electrostatic recording medium, and more particularly to an electrostatic recording medium whose volume resistivity is relatively unaffected by changes in humidity conditions.

BACKGROUND OF THE INVENTION AND PRIOR ART STATEMENT

It is known to produce an image by the so-called electrographic recording process. As disclosed in Blumenthal U.S. Pat. No. 3,611,419, the electrographic recording process is generally characterized by two basic steps. In the first step, a recording medium is provided and an electrostatic latent image is established on the recording medium by electrostatic recording heads connected to charging circuit means. In the second step, the electrostatic latent image is rendered visible by development of the charged areas on the recording medium. The Blumenthal patent is concerned with an electrographic imaging system and heads therefor. The recording medium of Blumenthal, generally indicated by the numeral 14 in FIG. 2 of that patent, is made of a dielectric layer 16 in contact with a conductive layer 18. The particular materials to be used for each layer, and the method for making the recording medium, are not given by Blumenthal.

In Tagawa U.S. Pat. No. 4,030,107, there is shown an electrographic recording device employing electrostatic induction electrodes. Here again, the patentee was primarily concerned with the electronics and the electrodes for use in an electrographic recording process: he was not particularly concerned with the recording medium therefor. In Tagawa, the recording medium 7 shown in FIG. 1 is made of two parts: a low resistance layer 7b and another layer 7a which appears to be not defined in the patent. In any event, the method of making the recording medium and the materials therefor are not stated in the Tagawa patent.

It is, therefore, an object of the present invention to provide a method for making a novel electrostatic recording medium;

It is another object of the present invention to provide a novel electrostatic recording medium for use in an electrographic process.

It is a further object of the present invention to provide a novel electrostatic recording medium whose volume resistivity is relatively unaffected by changes in humidity conditions.

These and other objects of the invention can be gathered from the following detailed disclosure.

SUMMARY OF THE INVENTION

The above objects are accomplished in accordance with the present invention by the provision of an electrostatic recording medium which is made of a base, a resistance layer on the base, a recording layer on said resistance layer, and an adhesive layer between the recording layer and the resistance layer for bonding the two latter layers together for proper electrical contact. The adhesive layer is made of a conductive polymeric emulsion having a conductive filler dispersed therein.

DETAILED DESCRIPTION OF THE INVENTION

As indicated above, this invention relates to an electrostatic recording medium, and the method for making it, for use in electrostatic recording process in which electrostatic latent images are formed on the recording medium by one or more needlelike electrodes. The power and signals supplied to the electrodes are from a scanning device known in the art. After the electrostatic images are formed on the recording medium, the images are developed and transferred to a receiving sheet, such as paper.

Figure 1:
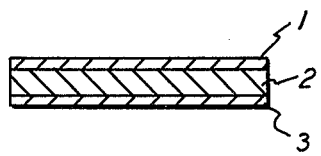
FIG. 1 shows a cross-sectional view of an electrostatic recording medium of the prior art.

The conventional recording medium for use with an electrostatic recording process is usually made of a conductive base, such as a conductive paper, with a resistance layer on the base and a recording layer on the resistance layer. Referring to FIG. 1, a cross-sectional view of such a conventional recording medium is shown, in which the numeral 3 denotes a conductive base substrate, the numeral 2 denotes a resistance layer, and the numeral 1 refers to a recording layer. When the image is to be developed and fixed onto the recording medium, for example, when the recording medium is an electrostatic recording paper, the resistance layer is made of materials such as quaternary ammonium salts or the like. When the image developed on the recording medium is to be transferred to another receiving sheet, the resistance layer may be made of such materials as insulating resins having dispersed therein conductive powders include carbon black, metal powders and metal oxides. The recording layer may be made of a dielectric or insulating material.

The method for making the recording medium generally involves coating a resistance layer on a conductive base substrate and then coating a recording layer over the resistance layer. In view of the materials involved, it had been necessary in the prior art to select a solvent for dissolving the recording layer material in preparation to the coating operation. However, the solvent must be selected so as not to dissolve the resistance layer in the coating process. This places a restriction to the selection of the materials to be used for the recording layer and for the resistance layer. In addition, the coating operation presents a problem in that surface smoothness and strength of the recording layer must be obtained. In view of these considerations, it is advantageous to use a polyester film, such as a 6 micron thick Mylar film (trademark of the duPont Company), as the recording layer. The Mylar film may be laminated to the conductive base-resistance layer structure. The present invention provides a method for producing a laminated electrostatic recording medium, and the electrostatic recording medium produced thereby, whose volume resistivity is relatively unaffected by changes in humidity conditions.

Figure 2:
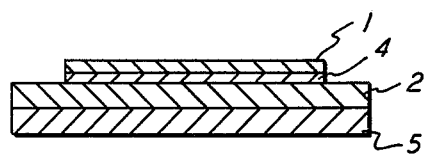
FIG. 2 represents a cross-sectional view of the electrostatic recording medium of the present invention.

Referring to FIG. 2, an electrostatic recording medium of the present invention is shown in which the electrostatic recording medium is made of a base layer 5, a resistance layer 2 and a recording layer 1. The base layer is an electrically insulating layer with a volume resistivity of over $10^{14}$ ohm cm. The base layer may be made of, for example, films of polyethylene, polypropylene, polyethylene terephthalate, polyvinyl acetate, or resin impregnated paper, etc. It is generally about 20-120 microns thick when dry. The resistance layer is a semiconductive layer with a volume resistivity of about $10^6$–$10^9$ ohm cm. It is generally about 5-50 microns thick when dry and it may be made of a coating of a resin solution containing a conductive material. For example, the resin may be a styrene, an acrylate, a polycarbonate, a saturated polyester, a polyurethane, etc., present in an amount about 40-90 percent by weight; and the conductive material may be fine particles (average diameter of about 0.5-2 microns) of carbon black, a metal powder (such as copper, aluminum, etc.), a metal oxide powder, etc., present in an amount about 60-10 percent by weight. The recording layer is an electrically insulating layer which is heat laminatable to the other layers. For example, the recording layer my be a film of polyethylene terephthalate or polypropylene of about 3-12 microns in thickness. The recording layer and the resistance layer are bonded together through an adhesive layer 4 by heat lamination.

The adhesive layer of the present invention is a semiconductive layer about 1-5 microns thick and having a volume resistivity of about $10^6$–$10^9$ ohm cm, which is similar to that of the resistance layer. The volume resistivity of the adhesive layer is important: it must not be lower than that of the resistance layer since then a latent image could not be formed; and it should not be substantially higher than that of the resistance layer since then higher signal voltages on the needlelike electrodes are required. The adhesive layer is a film of a conductive polymeric emulsion having dispersed therein a conductive filler. The conductive filler is present in an amount about 10-40 percent by weight of the adhesive layer and it may be the same type of materials used as the conductive material in the resistance layer. The conductive polymeric emulsion is present in an amount about 60-90 percent by weight and it is a mixture of an aqueous emulsion (45-89.5 percent by weight of the adhesive layer) of an acrylic polymer such as homopolymers or copolymers of methyl methacrylate, ethyl methacrylate, methyl acrylate, ethyl acrylate, n-butyl acrylate, a vinyl acetate polymer, a vinyl chloride polymer, a styrene butadiene copolymer, a chloroprene polymer, etc., and a conductive monomer and/or a surface active agent (0.5-15 percent by weight of the adhesive layer). The conductive monomer may be a conductive vinyl monomer having sulfoxylate or quaternary ammonium salt therein and selected from the following general formula:

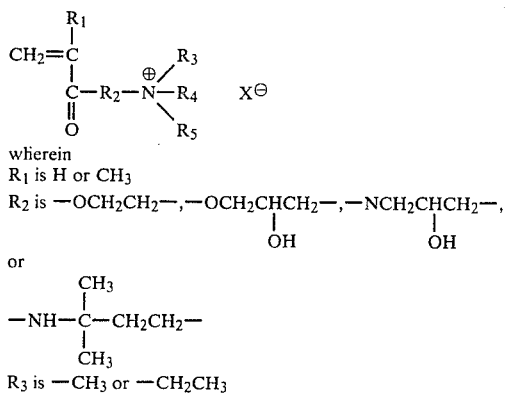

(I)

wherein
$R_1$ is H or $CH_3$
$R_2$ is $-OCH_2CH_2-$, $-OCH_2\underset{OH}{C}HCH_2-$, $-N\underset{OH}{C}H_2CHCH_2-$, or
$-NH-\underset{CH_3}{\overset{CH_3}{C}}-CH_2CH_2-$ $R_3$ is $-CH_3$ or $-CH_2CH_3$ $R_4$ is $-CH_3$ or $-CH_2CH_3$

and
$X^\ominus$ is $Cl^\ominus$ or $Br^\ominus$
when $R_5$ is $-CH_2CH_2CH_2SO_3^\ominus$, $X^\ominus$ is not necessary.

(II)

wherein
n is 0 or 1
M is alkaline metals (Li, Na, K) or $NH_4$.

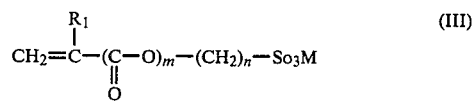

(III)

wherein
m is 0 or 1
n is 1~4
$R_1$ is H or $CH_3$
M is alkaline metals (Li, Na, K) or $NH_4$ The surface active agent may be anyone of:
a. an anionic surfactant such as an alkyl aryl sulfonate
b. a cationic surfactant such as

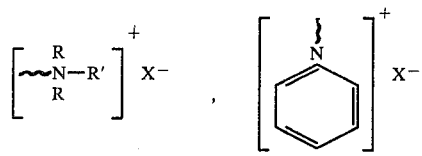

wherein
X is a halogen
R is alkyl
R' is alkyl or benzyl c. an ampholytic surfactent such as

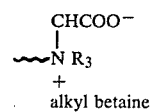

alkyl betaine

Although both thermosetting and thermoplastic resistor elements have generally been employed as the resistance layer for the electrostatic recording medium, insulting films generally cannot be heat laminated to thermosetting resistor elements. In accordance with the present invention, such heat lamination is made possible by the use of the adhesive layer herein. Moreover, when a solvent soluble type adhesive is applied on a nonsetting resistor element, the resistance layer itself may be attacked by a solvent unless the solvent was carefully selected. In accordance with the present invention, such attack on the resistance layer by the adhesive layer would not occur since the material for making the adhesive layer herein is an aqueous emulsion.

The present invention, in utilizing an aqueous system for the adhesive layer, realizes the further advantage that possible pollution problems in connection with the use of organic solvents for tacky adhesives for lamination are eliminated.

Figure 3:
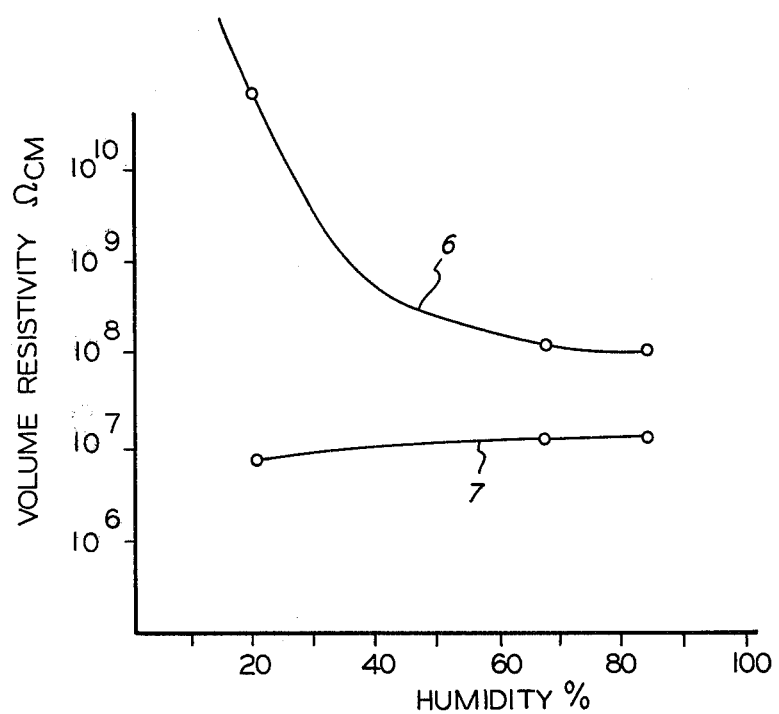
FIG. 3 is a graph comparing the changes in the volume resistivities of two electrostatic recording media.

The film of adhesive layer made in accordance with the present invention is stable over a relatively wide temperature range. In addition, the volume resistivity of the adhesive layer of the present invention and the volume resistivity for the electrostatic recording medium produced thereby are relatively stable over a wide range of humidity conditions. This is shown in the graph in FIG. 3. In FIG. 3, volume resistivity in ohm cm is plotted against humidity. Curve 7 in FIG. 3 represents the behavior of a dried adhesive layer made in accordance with the present invention, that is, a conductive polymeric acrylic emulsion having a conductive filler and a conductive monomer dispersed therein. Curve 6 in FIG. 3 represents the behavior of a dried film made with a conductive polymeric acrylic emulsion with only the conductive monomer dispersed therein. It can be seen from FIG. 3 that the film made from the emulsion containing a conductive filler, i.e., carbon black, as well as a conductive monomer, dispersed therein is much better than the film made with an emulsion containing no carbon black, in that the curve 7 shows a relatively constant volume resistivity over a wide range of humidity conditions.

Figure 4:
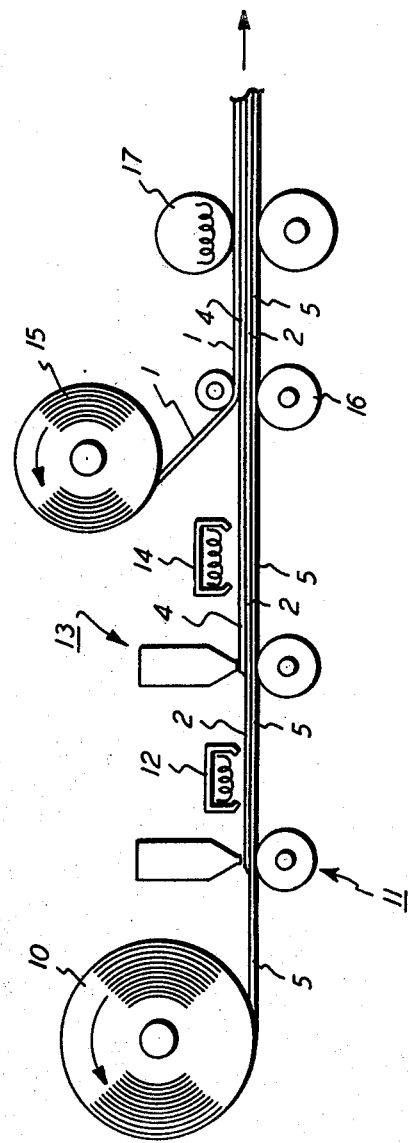
FIG. 4 is a schematic illustration of a continuous process for making the electrostatic recording medium.

The electrostatic recording medium of the present invention may be made by coating a base layer with a resistance layer material and, after drying the coating, coat the adhesive layer material on the dried resistance layer. A recording layer is then placed over the dried adhesive layer and heat-laminated together at a temperature between about 60°–100° C. and at a pressure between about 10–50 kg/cm. A schematic illustration of a continuous process for making the electrostatic recording medium is shown in FIG. 4. In FIG. 4, a thin film of a base layer material 5 from a supply 10 is first coated at coating station 11 with a layer of the resistance layer material 2, dried at a drying station 12, and then coated at coating station 13 with a layer of the adhesive layer material 4 and dried at a drying station 14. A film of the recording layer material 1 from a supply 15 is overlaid on the dried adhesive layer 4 through guide rollers 16 and heat-laminated at station 17 by the application of heat and pressure.

The invention will be further described with reference to the following examples.

EXAMPLE I

An electrostatic recording medium as shown in FIG. 2 was made with a 75 micron thick Mylar layer as the base 5. The resistance layer was made with a polyester type resin having carbon black dispersed in it to adjust the volume resistivity to $10^7$ ohm cm. The resistance layer was about 20 microns thick. A two micron thick layer of coating of an adhesive layer 4 was made within an aqueous acrylic emulsion of about 50% by weight resin and 50% water, whose volume resistivity was adjusted to $10^9$ ohm cm with a conductive monomer, sodium p-styrene sulfonate, and the entire volume resistivity was adjusted by the dispersion of carbon black to $10^7$ ohm cm, which volume resistivity equals that of the resistance layer. This resulted in a formulation for the adhesive layer which is about 60% by weight acrylic emulsion, 10% sodium p-styrene sulfonate, and 30% carbon black.

A 6 micron thick Mylar was used as a recording layer 1. The 6 micron Mylar was laid over the adhesive layer and laminated to the structure at 70° C. under 20 Kg/cm to form the recording medium.

When a multi-needle electrode is applied on the recording medium, and a positive signal voltage of 700 volts was applied to the recording medium, satisfactory images with high resolving power was obtained. This recording medium had excellent surface smoothness and it can withstand 10,000 cycles of development, transfer and cleaning steps.

EXAMPLE II

The procedure of Example I was repeated except that room temperature setting type urethane resin, having carbon black dispersed therein to adjust the volume resistivity to $10^7$ ohm cm, was used in place of the polyester type resin as the resistance layer material. The electrostatic recording medium so obtained also produced satisfactory images at an applied potential of +700 volts. The electrostatic recording medium also could withstand 10,000 cycles of development, transfer and cleaning steps.

In contrast to the results obtained in Examples I and II above, an electrostatic recording medium prepared by coating saturated polyester, for example, a polyester available under the tradename Stuffix, available from the Fuji Film Company, in a 2–5 micron layer onto the resistance layer without using the adhesive according to the present invention, required a signal voltage for the image formation which is about 100 volts higher than that required for the electrostatic recording media of Examples I and II. Moreover, such a recording medium, which is without the adhesive layer according to the present invention, showed inferior resolving power as compared with the recording media of Examples I and II.

While the invention has been described in detail with reference to specific preferred embodiments, it will be appreciated that various modifications may be made from the specific details without departing from the spirit and scope of the invention.

What is claimed is:

1. An electrostatic recording medium, for use in an electrographic process for forming an electrostatic latent image by the action of one or more electrodes, which comprises an electrically insulating base having a volume resistivity greater than about $10^{14}$ ohm cm, a resistance layer having a volume resistivity of from about $10^6$ ohm cm to about $10^9$ ohm cm on said base, an adhesive layer on said resistance layer, said adhesive layer being made of a conductive polymeric emulsion having a conductive filler dispersed therein and having a volume resistivity of from about $10^6$ ohm cm to about $10^9$ ohm cm, said volume resistivity of said adhesive layer being not lower than said volume resistivity of said resistance layer and an electrically insulating recording layer laminated to said resistance layer by said adhesive layer, said adhesive layer being made of a material so that the volume resistivity of the resultant recording medium is relatively unaffected by changes in humidity conditions.

2. An electrostatic recording medium according to claim 1 wherein said resistance layer is made of a thermosetting or thermoplastic resin.

3. An electrostatic recording medium according to claim 2 wherein said resistance layer is made of a polyester resin or a urethane resin, and whose volume resistivity is adjusted by the dispersion of carbon black therein.

4. An electrostatic recording medium according to claim 2 wherien said recording layer is made of a dielectric or insulating material.

5. An electrostatic recording medium according to claim 4 wherein said recording layer is made of a polyester.

6. An electrostatic recording medium according to claim 1 wherein said conductive polymeric emulsion is a conductive emulsion of an acrylic material, vinylacetate, vinylchloride, styrene-butadiene or chloroprene.

7. An electrostatic recording medium according to claim 6 wherein said conductive filler is carbon black.

8. An electrostatic recording medium according to claim 1 wherein the volume resistivity of the adhesive layer is greater than the volume resistivity of the resistance layer.

9. An electrostatic recording medium according to claim 1 wherein said recording layer is from about 3 to about 12 microns thick and the adhesive layer is from about 1 to 5 microns thick.

10. An electrostatic recording medium according to claim 9 wherein said resistance layer is from about 5 to about 50 microns thick and said base is from about 20 to about 120 microns thick.

* * * * *